July 19, 1955  E. P. KENNEDY  2,713,366
CRANK-OPERATED NUT CRACKER
Filed April 12, 1954
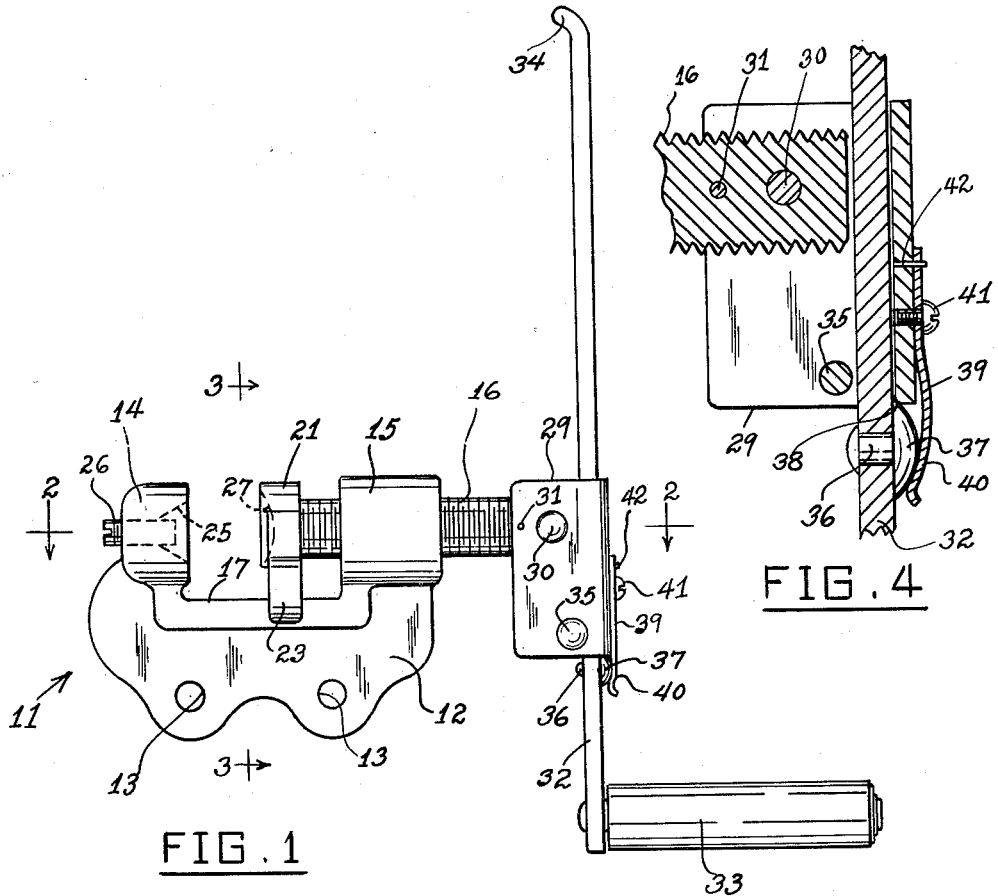
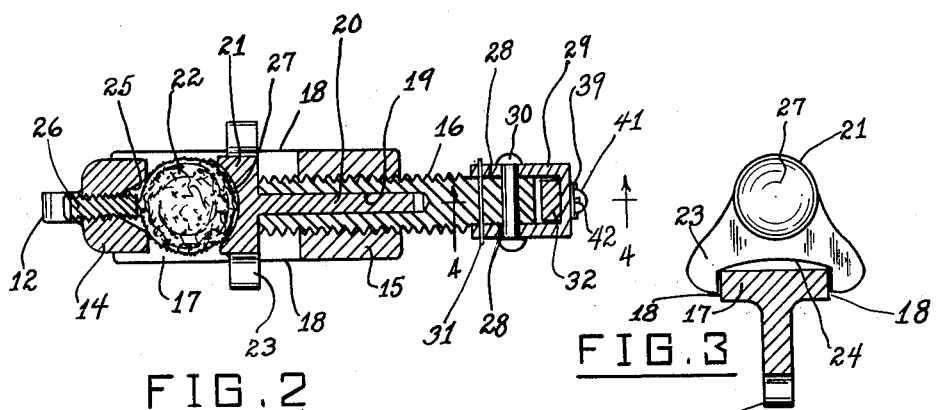
INVENTOR.
EUGENE P. KENNEDY
BY Herman L. Gordon
ATTORNEY

United States Patent Office 2,713,366
Patented July 19, 1955

2,713,366

CRANK-OPERATED NUT CRACKER

Eugene P. Kennedy, Tulsa, Okla.

Application April 12, 1954, Serial No. 422,339

2 Claims. (Cl. 146—16)

This invention relates to nut crackers, and more particularly to a device especially suited for cracking relatively hard-shelled nuts, such as black walnuts.

A main object of the invention is to provide a novel and improved nut cracking device of the type disclosed in my prior Patent No. 2,646,831, granted July 28, 1953.

A further object of the invention is to provide an improved nut cracker especially suited for cracking hard-shelled nuts, such as black walnuts, said nut cracker being simple in operation and construction, and being provided with an adjustable cracking cup which may be adjusted in depth to conform with the shape of the ends of the nuts to be cracked by the device, whereby the nuts are securely embraced in the cracking cup while cracking pressure is applied to the nuts, and being arranged so that the cracking cup can be adjusted so that the ends of the nuts bear on the bottom and rim of the cup with substantially equal pressures, so that a more complete cracking of the nuts is accomplished.

A still further object of the invention is to provide an improved nut cracker for cracking black walnuts and similar hard-shelled nuts, said nut cracker being inexpensive to manufacture, being durable in construction, and having an adjustable operating crank handle arranged so that in one position the crank handle may be turned by one hand of the operator relatively rapidly without danger of said crank handle striking the other arm of the operator, employed for holding the nut in place, whereas, when necessary, the crank handle may be extended in length to a second position to apply a relatively large torque to the device, such as, after a nut has been clamped tightly between the cracking cups of the device.

Further objects and advantages of the invention will become apparent from the following description and claims, and from the accompanying drawings, wherein:

Figure 1 is a side elevational view of an improved nut cracker constructed in accordance with the present invention.

Figure 2 is a horizontal cross-sectional view taken on line 2—2 of Figure 1.

Figure 3 is a transverse vertical cross-sectional view taken on line 3—3 of Figure 1.

Figure 4 is an enlarged cross-sectional detail view taken on line 4—4 of Figure 2.

Referring to the drawings, the improved nut cracker is designated generally at 11. Said nut cracker comprises a horizontally arranged body member 12 adapted to be attached to a table edge or similar horizontal surface by means of suitable screws or similar fasteners engaged through openings 13 provided in said body member. The body member is formed at one end thereof with an outer jaw 14 and at the other end with an inner lug 15, through which is threaded a drive screw 16, which is axially aligned with the outer jaw 14.

Body member 12 is formed with the bed portion 17 having the parallel side edges 18, 18. The inner portion of drive screw 16 is formed with a relatively long axial bore 19 in which is rotatably disposed the shaft element 20.

Shaft element 20 is formed integrally with a travelling jaw 21, which is arranged in axially aligned relation with stationary jaw 14 and cooperates therewith to crush a nut 22 therebetween when the travelling jaw 21 is moved sufficiently toward stationary jaw 14, as will be presently described. Nut 22 is of the hard-shelled type, such as a black walnut, which requires considerable force thereon to be crushed.

As shown, travelling jaw 21 is formed with a downwardly flaring vertical transverse flange 23 having an arched notch 24 formed in its bottom portion, said arched notch receiving the bed 17 and being longitudinally slidable therealong.

Jaw 14 is formed at its inner face with a generally conical recess 25 axially aligned with movable jaw 21 to receive one end of a nut 22. Threadedly engaged axially through the jaw 14 is an adjusting screw 26 which is adjustable inwardly and outwardly to vary the effective depth of the recess 25, so that the shape of the recess may be effectively adjusted in accordance with the size of the point on the end of the nut 22 received in the recess, whereby the end of the nut will be engaged by the end of screw 26 while the surface portions of the nut adjacent the end thereof will be engaged by the adjacent rim of the conical recess 25, as shown in Figure 2. Screw 26 is preferably of substantial diameter to distribute the bearing force applied by its end to the end of the nut.

The travelling jaw 21 is formed with a smoothly rounded recess 27 axially aligned with and opposing the conical recess 25 in stationary jaw 14.

The outer end of drive screw 16 is formed with the parallel flat surfaces 28, 28, which are received within the upper portion of a vertical channel member 29. A transverse rivet 30 extends through the walls of said channel member at said upper portion and through the intervening outer end of drive screw 16. A transverse pin 31, spaced inwardly from rivet 30, extends through the channel walls and drive screw 16, preventing rotation of channel member 29 relative to drive screw 16.

Slidably disposed in the channel member 29 between the end of drive screw 16 and the bottom wall of the channel member is the crank bar 32, said crank bar being preferably rectangular in cross-sectional shape, as shown in Figure 2, and being of substantial length. The crank bar 32 is provided at one end with a handle 33 extending outwardly at right angles to the crank bar. At its opposite end, the crank bar is formed with an inwardly extending stop lug 34 which is receivable in the upper portion of channel member 29 when the crank bar is in its fully extended position, and which is cooperable with the end of drive screw 16 to prevent further extension of the crank bar.

A transverse rivet 35 extends through the lower portion of the channel member 29 inwardly adjacent the crank bar 32, preventing inward rotation of the crank bar away from the bottom wall of said channel member. A stop rivet 36 is provided on the lower portion of crank bar 32, as viewed in Figure 1, said rivet having the enlarged spherical outer head 37 which is wedgingly engageable against the bevelled inside edge 38 of the bottom wall of channel member 29, as shown in Figure 4, to limit inward movement of the crank handle 33 toward the axis of the drive screw and to limit inward adjustment of the crank bar to the position shown in Figures 1 and 4.

Designated at 39 is a yieldable leaf spring having an arcuately curved detent portion 40 lockingly engageable over the head 37 of rivet 36. Leaf spring 39 is secured to the outer surface of the bottom wall of channel member 29 by a screw 41. A positioning pin 42, secured in the wall of said channel member, extends through an aperture in the upper end portion of spring 39, as viewed in Figure 4, and secures the leaf spring against rotation relative to the channel member. Leaf spring 39 yieldably locks the crank bar 32 in the shortened position thereof shown in Figure 1.

In operation, the screw 26 is first adjusted to provide a desired effective depth of recess 25, corresponding to the amount of point of the ends of the nuts 22 to be cracked. A quantity or lot of nuts coming from the same source will usually have approximately the same shape, so that a single adjustment of screw 26 will ordinarily suffice, in cracking such a quantity of nuts.

While the operator holds a nut 22 in place between jaws 21 and 14 with one hand, he operates crank handle 33 with the other hand and rapidly rotates crank bar 32 until the nut is clamped tightly between the recesses 25 and 27. In the position of Figure 1, the crank bar 32 is short enough to be rotated rapidly by said other hand of the operator without interfering with the arm of the operator employed for supporting the nut between the jaws.

After the nut has been thus clamped between the jaws, the crank arm is pulled out to its fully extended position to provide the increased leverage needed to crack the nut with ease. Only a few additional turns of the lever arm will be required to crack the nut.

As shown in Figure 2, the nut 22 is preferably positioned lengthwise between the jaws 14 and 21, namely, with its longitudinal axis substantially aligned with the axis of screw 16.

Although the nut cracking device above described is primarily intended for cracking black walnuts, the adjusting screw 26 which enables the effective shape of recess 25 to be adjusted, makes the device also suitable for cracking most other nuts, such as hickory nuts, butter nuts, and small and large pecans.

For some nuts it is not necessary to extend the crank bar 32 to its outermost position, since for such nuts the normal position of the crank bar will provide sufficient force to crack the nuts with ease.

While a specific embodiment of a nut cracking device has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a nut cracker, a body member, a pair of cooperating cracker jaws carried by said body member, said jaws being formed with opposing recesses to receive opposite portions of a nut, one recess being rounded and the other conical, a screw member theadedly engaged axially in the conical recess and being no greater in diameter at its inner end than at its intermediate portion for adjusting the effective shape of the inner portion of the conical recess, a drive screw threaded through a portion of the body member and being arranged to move one of the jaws toward the other, a channel member rigidly secured to the end of the drive screw and extending at right angles to said drive screw, a crank bar slidably received in said channel member adjacent the end of said drive screw for common rotational movement with said drive screw, transverse guide means in said channel member retaining said crank bar in a position substantially parallel to said channel member, stop means on said crank bar engageable with said channel member to limit sliding movement of said crank bar relative to said channel member, and a yieldable leaf spring member secured to said channel member and being formed and arranged to lockingly interengage with a portion of said crank bar.

2. In a nut cracker, a body member, a pair of cooperating cracker jaws carried by said body member, said jaws being formed with opposing recesses to receive opposite portions of a nut, a drive screw threaded through a portion of the body member and being arranged to move one of the jaws toward the other, a channel member rigidly secured to the end of the drive screw, a crank bar slidably received in said channel member adjacent the end of said drive screw for common rotational movement with said drive screw, means on the end of said crank bar engageable with said channel member to limit outward sliding movement of said crank bar, a locking projection on the intermediate portion of said crank bar, and a yieldable leaf spring member secured to said channel member and being formed and arranged to at times lockingly interengage with said locking projection.

References Cited in the file of this patent

UNITED STATES PATENTS

| | | |
|---|---|---|
| 849,792 | Jowitt | Apr. 9, 1907 |
| 1,052,926 | Kogut | Feb. 11, 1913 |
| 1,371,350 | Campbell | Mar. 15, 1921 |
| 2,521,050 | Early | Sept. 5, 1950 |
| 2,646,831 | Kennedy | July 28, 1953 |

FOREIGN PATENTS

| | | |
|---|---|---|
| 204,363 | Germany | Nov. 21, 1908 |